UNITED STATES PATENT OFFICE.

CHRISTIAN VOLCKMANN, OF COLUMBUS, OHIO, ASSIGNOR TO OTTO DRESEL, JOHN SELTZER, AND PHILIP A. SCHLAPP, OF SAME PLACE.

IMPROVED ARTIFICIAL MARBLE.

Specification forming part of Letters Patent No. 97,004, dated November 16, 1869.

*To all whom it may concern:*

Be it known that I, CHRISTIAN VOLCKMANN, of Columbus, Franklin county, State of Ohio, have invented a new and useful Artificial Marble; and that the following is a full, clear, and exact description of my invention:

The nature of my invention consists in the preparation of various compounds, of the consistency of dough or mortar, composed of several ingredients; in combining and mixing together those various compounds; in producing, from the compounds thus prepared, combined, and mixed together, a beautifully-veined artificial marble in sheets, or molded into mantels, counters, furniture, urns, vases, columns, obelisks, tombstones, monuments, and into any form whatever, and in a peculiar process of polishing said marble, which, when finished, equals if not excels the genuine marble in durability, appearance, and glossy surface.

To enable others skilled in the art to make such marble and use such invention, I proceed to describe its several ingredients, and the mode of preparing and combining the various compounds, and the making the marble with them, and the manner of working and polishing said marble.

I. *Ingredients calculated in proportion to the quantity of plaster-of-paris needed for a mantel of ordinary size.*

For other articles the proportions remain the same, according to the greater or lesser quantity of plaster-of-paris needed.

1. The ingredients of the first or alum-glue compound are, alum, one and a half pound; glue, three pounds; six or seven quarts of water; one-half ounce of sulphuric acid or carbonic acid.

2. The ingredients of the second or plaster-of-paris compound are, about one hundred pounds of plaster-of-paris, added to and mixed with the first compound.

3. The ingredients of the third or coloring compound are, for black, lamp-black, dissolved in alcohol or whisky; for red, cinnabar; for other colors, pulverized earth colors, (metallic colors cannot be used,) saturated with water.

The coloring matter for the principal color is mixed up with the second or plaster-of-paris compound, at the rate of from two to eight pounds of coloring matter added to about one hundred pounds of the plaster-of-paris compound.

The coloring matter for the veining of the marble, (from two to four pounds to about two quarts of water or the corresponding quantity of alcohol or whisky,) after being mixed up with a small quantity of plaster-of-paris, (not exceeding five pounds,) is worked into the consistency of mortar, and then added to the second or plaster-of-paris compound.

Of course the relative amount of colors to be used in any case, depending, as it does, on the strength of the color desired, the quality of the ingredients, and the appearance which the marble is to present, must be left to the judgment of the workman.

4. The ingredients of the fourth, or gravel compound, are, about one hundred pounds of well-cleaned gravel, of the size of peas or beans, mixed with about the same quantity of plaster-of-paris and a small quantity of the first or alum-glue compound.

II. *Mode of preparing and combining the various compounds, and making marble with them.*

1. To prepare the first, or alum-glum compound, I dissolve one and a half pound of alum and three pounds of glue in six or seven quarts of boiling water, add about one-half ounce of sulphuric acid or carbonic acid, and stir well, so that the ingredients named become thoroughly mixed.

2. Next, I take the colors I desire for the marble. If black, I dissolve about two pounds of lamp-black in alcohol or whisky; other colors (earth colors, not metallic colors) I saturate with water, at the rate of from four to five pounds to about two quarts of water, being careful not to use more water than is absolutely necessary to reduce the pulverized color to the consistency of mortar.

3. Next, I put about one-half of the plaster-of-paris I want to use, not exceeding about two hundred pounds for a mantel of ordinary size, on a clean table; soak it with a portion of the alum-glue compound; work the mixture vigorously with a trowel until it forms a stiff dough.

4. Next, I mix my coloring matter with the compound on the table, substantially as described below.

In order to give an accurate idea, I will minutely describe the process for the manufacture of a mantel of black marble with yellow and red veins.

I mix the lamp-black, dissolved in alcohol or whisky, with the compound on the table, in different shades, say five, as follows:

I first mix one pound of lamp-black with the compound on the table, work thoroughly with a trowel until the whole mass assumes an evenly-black color; cut a piece off, say one-fifth, and lay it aside.

Then I mix one-quarter pound of lamp-black with the remaining mass, work well with my trowel until it also becomes evenly black, of course a shade darker than the first mixture; cut one-fifth off, and lay it aside.

This process I repeat until the two pounds of lamp-black are mixed up with the compound.

Thus I get five separate pieces of the colored compound, of five different shades of black.

Those five pieces I divide into loaves, varying in size, and place them close to each other, but so that none of the successive shades are put together.

5. Then I take about five pounds of the remaining one hundred pounds of plaster-of-paris, place them on another clean table, soak them with a portion of the alum-glue compound, mix with it about one-half pound of yellow color, saturated with water, and about one-half ounce of cinnabar; work the mixture well with my trowel until it is of the consistency of mortar, then spread it over and between the black loaves on the other table, so that the tops and sides of the same are covered with the yellow and red mortar; then I lift up with the trowel about one-third of the loaves on either side of the mass, and turn them carefully over on top of the loaves in the center, so that their position is reversed.

The same process I repeat with the loaves on the opposite side, so that the whole mass now forms three layers of loaves. I then knead the mass with my hands, so that it becomes closely united and compact.

Then I cut the mass into slices, each one-half inch thick, and cover the mold prepared for the mantel (or other article I want to produce) with those slices, placing them as close to each other as possible, after which I cover and fill the crannies between the slices with the alum-glue compound, so that the surface becomes even and tolerably smooth.

6. Next I sieve the gravel, (about one hundred pounds,) so that it becomes thoroughly freed from all sand and other foreign matters, and mix it with the remaining ninety-five pounds of plaster-of-paris.

To the mixture I add the remainder of the alum-glue compound, and work the mass with the trowel into the consistency of a thick mortar.

As soon as the marble mass in the mold is sufficiently hard, so as not to be penetrated any more by the gravel, I cover the same with a layer of the gravel-compound about one inch thick, so that the whole mixture is of the thickness of about one and a half inch.

7. The mass is to remain in the mould, ordinarily twelve hours, until it becomes stiff enough to be removed. Then I take it off from the mold and let it dry about two or three days.

After it is well dried, I plane it off smooth with a common plane, set very fine, and then dress it smooth with a scraper.

III. *Process of polishing the marble—Ingredients be used for that purpose.*

8. I polish the marble in the following manner:

First, I grind all pores and blisters open with a piece of smooth freestone, and, while so doing, sponge the mass freely with clean water.

Then I let it dry for about twenty-four hours in the sun or in a heated room.

Next, I fill the open pores and blisters (by means of a soft brush) with a mixture composed of about one and a half pound of plaster-of-paris and half an ounce of lamp-black, or a corresponding quantity of other leading color, after which I dress the surface smooth again with a wooden scraper, sponge freely with clean water, and let the mass dry again about twenty-four hours.

Then I polish it with coarse oil-stone, scrape, sponge freely with clean water, and let it dry again about twenty-four hours.

The same process I repeat with fine oil-stone, coarse Swedish black-stone, and fine Swedish black-stone, in the succession named.

Then I oil the surface with flaxseed-oil, (a few drops are sufficient,) and let the oil soak in overnight, after which I polish with bloodstone, scrape, sponging freely with clean water, and let the mass dry again about twenty-four hours.

Lastly, I rub a mixture of turpentine, quarter pound, and white wax, half ounce, with a soft woolen rag over the whole surface of the marble, until it obtains a brilliant gloss.

9. The artificial marble thus produced I either use in sheets, (for ceilings or walls of houses or rooms,) or mold it into mantels, furniture, counters, vases, urns, columns, obelisks, and other useful and fancy articles. It may be made of any form or color, and may safely be exposed to the open air.

Having thus fully described my invention, I wish to be understood, that although I have given what I consider to be the best proportions and processes for making artificial marble, yet I reserve the right to vary somewhat from these proportions, and details of pro- ceeding, without giving up my title to this invention.

I do not claim as my invention any of the ingredients taken separately; but

I do claim as my invention, and desire to secure by Letters Patent—

1. The preparation of the various compounds, and the combining of the same, substantially in the manner as hereinbefore set forth, for the purpose of producing artificial marble.

2. An artificial marble, composed of the above-named ingredients, compounded substantially as hereinbefore specified, and to be used in sheets for ceilings, walls of houses or rooms, or otherwise, or to be molded into mantels, counters, furniture, vases, urns, columns, obelisks, monuments, &c., and useful and applicable for all other purposes to which genuine marble is applied, besides being susceptible of many uses to which genuine marble cannot be practically applied.

3. The process of polishing the marble so produced, substantially in the manner and by means of the ingredients hereinbefore set forth, so as to give it a brilliant and durable gloss, equal, if not superior to, that of polished genuine marble.

In testimony whereof, I have hereunto set my hand in presence of two witnesses, this 20th day of October, A. D. 1869.

CHRISTIAN VOLCKMANN.

Witnesses:
J. S. MATHENY,
M. FRANKEL.